(12) United States Patent
Seibel

(10) Patent No.: US 6,690,139 B1
(45) Date of Patent: Feb. 10, 2004

(54) METHOD AND APPARATUS TO LIMIT MOTOR CURRENT AT LOW FREQUENCIES

(75) Inventor: Brian Seibel, Grafton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/247,148

(22) Filed: Sep. 19, 2002

(51) Int. Cl.[7] .................................................. H02P 5/28
(52) U.S. Cl. ...................... 318/798; 318/805; 318/448; 318/807; 318/812
(58) Field of Search ................................. 318/805, 804, 318/448, 807, 812, 798, 801, 432, 434, 619, 811, 772, 802, 808, 809, 810, 8

(56) References Cited

U.S. PATENT DOCUMENTS

| | | | | |
|---|---|---|---|---|
| 5,619,114 A | * | 4/1997 | Blasko | 318/812 |
| 5,689,169 A | * | 11/1997 | Kerkman et al. | 318/807 |
| 5,811,949 A | * | 9/1998 | Garces | 318/448 |
| 6,014,007 A | * | 1/2000 | Seibel et al. | 318/805 |

* cited by examiner

*Primary Examiner*—Karen Masih
(74) *Attorney, Agent, or Firm*—Quarles & Brady LLP; William R. Walbrun

(57) ABSTRACT

A method and apparatus for use with an induction machine system including a controller and d and q-axis current feedback loops, the controller receiving a frequency command signal and generating d and q-axis voltage command signals, the method for limiting load current to a level below a limit current at low operating frequencies, the method comprising the steps of identifying an operating frequency as a function of the d and q-axis feedback currents, where the operating frequency is below a low threshold value: comparing a feedback current to the limit current; and where the feedback current exceeds the limit current, reducing the q-axis voltage command value.

20 Claims, 8 Drawing Sheets

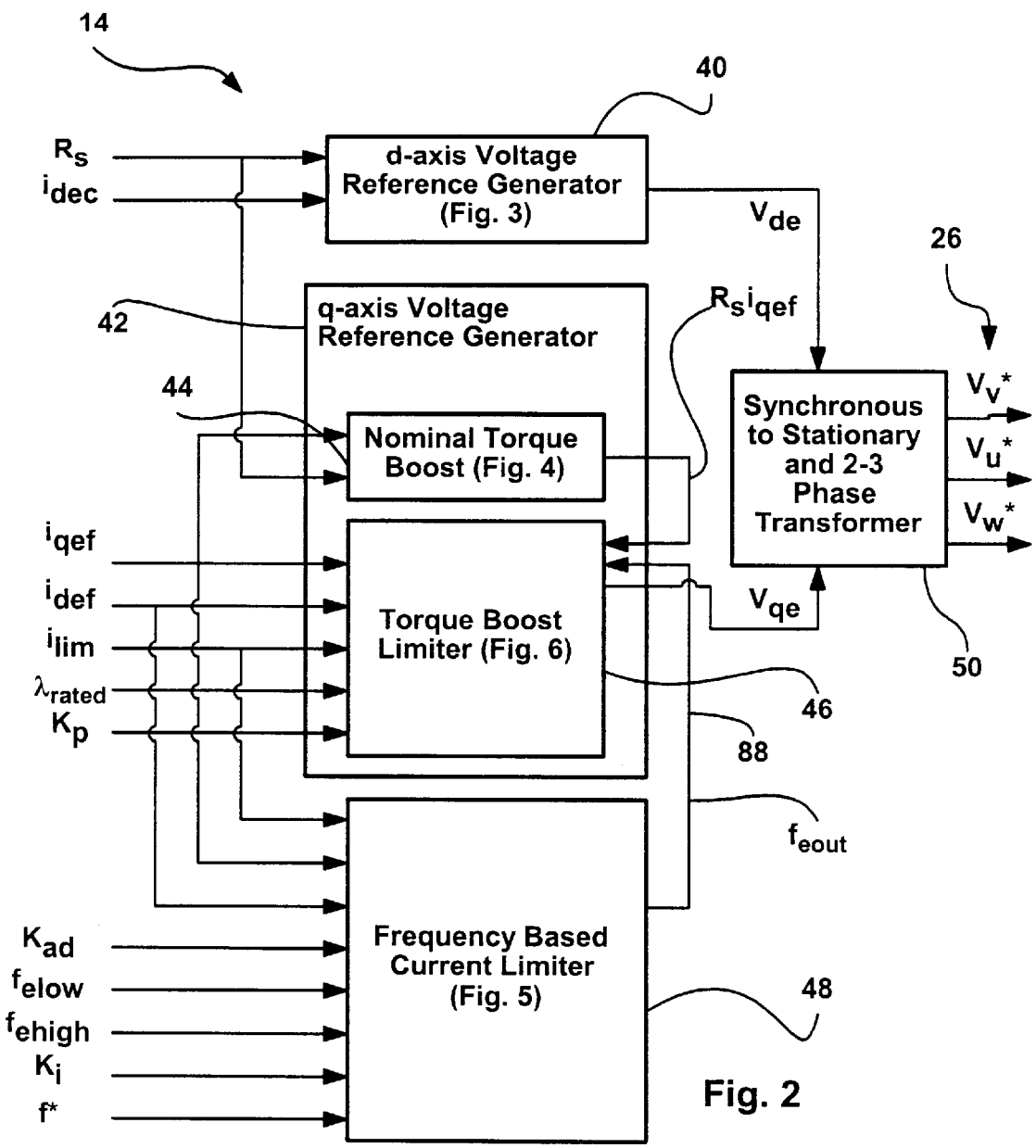
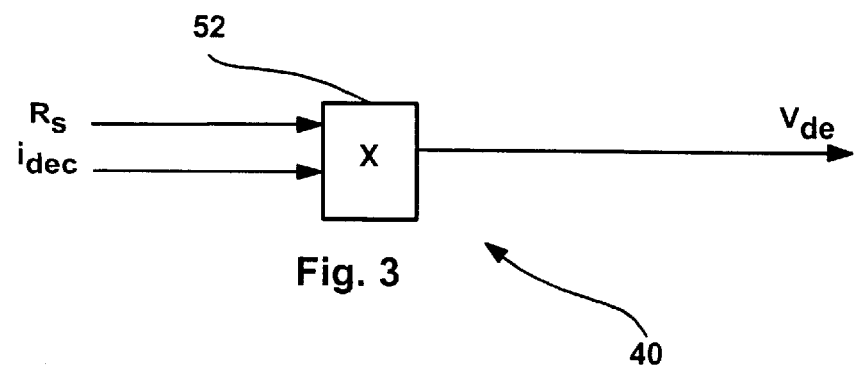
Fig. 2
Fig. 3

METHOD AND APPARATUS TO LIMIT MOTOR CURRENT AT LOW FREQUENCIES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is motor controllers and more specifically a method and apparatus for limiting current in an open loop adjustable frequency motor drive at low operating frequencies.

Induction motors have broad application in industry. An induction motor system typically includes a driver or controller, a power conversion configuration and an induction motor itself. The power conversion configuration generally receives power via supply lines and converts the received power into a form that can be provided to the motor thereby causing a motor rotor to rotate. The conversion configuration typically includes a plurality of semiconductor switching devices that link the supply lines to motor terminals and, based on switch turn on and turn off cycles, provide power to the motor phases linked thereto.

One common type of motor is a three-phase induction motor that includes a stator and a rotor. The stator typically forms a cylindrical stator cavity. One common rotor design includes a "squirrel cage winding" in which axial conductive rotor bars are connected at either end by shorting rings to form a generally cylindrical structure. The rotor is mounted in the stator cavity for rotation about a rotor axis. The stator windings are linked to three separate phases of the converter configuration to receive currents therefrom. The stator currents are controlled so that their combined effect is to generate a magnetic stator field that rotates about the stator cavity. The rotating stator field flux cuts across the conductive rotor bars and induces (hence the label "inductance motor") cyclic current flows through the bars and across the shorting rings. The cyclic rotor bar current flows in turn produce a rotor field. Interaction (e.g., pulling or pushing action) between the rotor field and the stator field causes the rotor to rotate.

By using induced rotor current to generate the rotor field, the need for slip rings or brushes (i.e., wearable mechanical components) is eliminated which renders induction type motors relatively maintenance-free and reduces overall costs associated with motor design. Among other reasons, relatively limited costs have made inductance motors preferred for many applications throughout industry.

To a first approximation the torque (i.e., rotational force on the rotor) and speed of an induction motor may be controlled by changing the frequency of the driving voltage and thus the angular rate of the rotating stator field. Generally, for a given torque, increasing the stator field rate will increase the rotor speed (which generally follows the stator field). Alternatively, for a given rotor speed, increasing the frequency of the stator field will increase the torque by increasing the slip, that is, the difference in speed between the rotor and the stator field. An increase in slip increases the rate at which flux lines are cut by the rotor bars thereby increasing the rotor-generated field and thus the force or torque between the rotor field and stator field.

Referring to FIG. 10, the rotating phasor 13 of the stator magneto motive force ("mmf") will generally form some angle $\alpha$ with respect to the phasor of rotor flux 19. The torque generated by the motor is proportional to the magnitudes of these phasors 13 and 19 but also is a function of their angle $\alpha$. The maximum torque is produced when phasors 14 and 18 are at right angles to each other (e.g., $\alpha=90°$) whereas zero torque is produced if these phasors are aligned (e.g., $\alpha=0°$). Phasor 13 may, therefore, be usefully decomposed into a torque producing component 15 perpendicular to the phasor 19 and a flux component 17 parallel to rotor flux phasor 18.

These two components 15 and 17 of the stator mmf are proportional, respectively, to two stator currents $i_{qe}$, a torque producing current, and $i_{de}$, a flux producing current, which may be represented by orthogonal vectors in a rotating or synchronous reference frame of the stator flux having slowly varying magnitudes. The subscript "e" is used herein to indicate that a particular quantity is in the rotating or synchronous frame of stator flux.

Accordingly, in controlling an induction motor, it is generally desired to control not only the frequency of the applied voltage (hence the speed of the rotation of the stator flux phasor 13) but also the phase of the applied voltage relative to the current flow and hence the division of the currents through the stator windings into the $i_{qe}$ and $i_{de}$ components. Control strategies that attempt to independently control currents $i_{qe}$ and $i_{de}$ are generally termed field oriented control (FOC) strategies.

The production of any given set of currents $i_{qe}$ and $i_{de}$ requires that the stator be excited with voltages $V_{qe}$ and $V_{de}$ as follows:

$$V_{qe}=(R_s)(i_{qe})+(2\pi f_e)(\lambda_{rated}) \qquad \text{Eq. 1}$$

$$V_{de}=(R_s)(i_{de}) \qquad \text{Eq. 2}$$

where $R_s$=stator resistance;

$i_{qe}, i_{de}$=synchronous motor currents aligned with the d and q-axis typically reflecting motor load and no load currents, respectively;

$f_e$=electrical field frequency in Hertz; and $\lambda_{rated}$=stator flux linkage=motor nameplate voltage/motor nameplate frequency (in Hertz).

The first terms on the right hand sides of each of Equations 1 and 2 are referred to as the stator resistive voltage drops. As the labels imply, the resistive voltage drops $R_s i_{qe}$ and $R_s i_{de}$ correspond to components of the voltage provided at a stator winding terminal that are dissipated by the stator winding resistance $R_s$. Because the resistive drops are provided to boost the commanded voltages and, in effect, overcome the stator resistance $R_s$, the resistive drops are often referred to as "voltage boost" terms. The second term $2\pi f_e \lambda_{rated}$ on the right hand side of Equation 1 is referred to generally as a reactive voltage drop and, as its label implies, corresponds to the component of the voltage provided at the stator winding terminal that causes inductance or interaction between the stator and the rotor.

Equations 1 and 2 above are the fundamental command equations employed by most voltage/frequency controllers. To implement Equations 1 and 2, the controller has to be provided with several of the terms in each of Equations 1 and 2.

In order to minimize costs, often controller/converter configurations are designed to be useable for many different purposes (i.e., to drive many different load types). For instance, one controller/converter configuration may be capable of driving any of several differently sized three phase motors where the motors have different operating characteristics. Thus, when designing controller/converters, manufacturers typically do not know exact characteristics of loads that will be linked to and driven by the controller/converters and, therefore, some controller operating parameters have to be set by customers after system configuration is completed.

The rated flux $\lambda_{rated}$ can be determined by dividing a name plate motor voltage by a nameplate frequency values while the stator winding resistance $R_s$ is typically determined by performing a commissioning procedure (e.g., see U.S. Pat. No. 5,502,360 for a commissioning procedure to determine $R_s$). The d-axis current $i_{de}$ may be determined in any of several different ways including use of a look-up table that correlates d-axis current with various motor parameters or by performing some type of commissioning procedure. Each of the d-axis current $i_{de}$, the stator resistance $R_s$ and the rated flux $\lambda_{rated}$ are stored in a controller memory for use during motor operation. The d-axis current $i_{de}$ typically is not adjusted during motor operation and therefore the d-axis voltage $V_{de}$ is set upon commissioning.

In addition to the components described above, most controllers also include some type of feedback mechanism to ensure that an associated load (e.g., motor) operates in a desired fashion. To this end, typical feedback loops include a rotor speed feedback and d and q-axis current feedbacks. The feedback signals are generally compared to commanded signals and, where errors occur, the commanded signals are modified to force the load toward desired operating characteristics. For instance, where a feedback rotor speed is less than a commanded rotor speed, the rotor speed error can be used to command a higher electrical frequency thereby increasing slip and torque on the rotor and causing the rotor speed to increase by a percentage of the increase in the electrical frequency.

To implement Equations 1 and 2, after rated flux $\lambda_{rated}$, stator resistance $R_s$ and d-axis current $i_{de}$ values are identified and stored in the motor controller memory, the controller receives a rotor speed command that indicates a desired motor rotor rotational speed. In addition, d and q-axis feedback currents $i_{def}$ and $i_{qef}$ are provided to the controller. The controller uses the commanded frequency and the feedback currents to generate suitable d and q-axis voltages $V_{de}$ and $V_{qe}$, respectively by solving Equations 1 and 2 above. Thereafter, the controller converts the d and q-axis voltages $V_{de}$ and $V_{qe}$ into three phase voltage commands to drive converter switches.

As with all electronic components, the switching devices that comprise the converter configuration are designed to operate within specific rated current operating ranges and will be damaged or may operate in unintended ways when driven outside the rated current ranges. Unfortunately, during induction motor operation, conditions have been known to occur that cause controllers to demand current levels outside rated ranges. For instance, when a load is increased, the load will generally slow the rotation of a motor rotor which causes a difference between a commanded frequency and an actual frequency. The frequency difference or error causes the controller to step up the commanded voltage thereby, referring again to FIG. 1, increasing the q-axis current $i_{qe}$. At high frequencies where the reactive drop is ten or more times the resistive drop, a reactive drop adjustment (e.g., $f_e$ adjustment) appreciably affects commanded voltage $V_{qe}$ while at a low frequency where the reactive drop may be one-fifth or less of the resistive drop, a reactive drop adjustment may not be capable of avoiding a current trip. At some point, as the load is increased, the q-axis current $i_{qe}$ exceeds the high end of a rated switch current range and switch damage or malfunction may occur.

To avoid switch damage/malfunction, most controllers now include a "current tripping" function wherein, when measured switch currents exceed the high end of a rated switch range, the control system trips and, in effect, cuts off current to the converter and load thereby protecting the converter switching devices. While tripping is clearly preferred to switch damage, tripping hinders system productivity and is to be avoided whenever possible.

To minimize current tripping, most controllers now include some type of current limiting feature. One common current limiting scheme reduces the commanded electrical frequency $f_e$ when the upper end of the rated switch current range is exceeded. Referring again to Equation 1, when frequency $f_e$ is reduced, the commanded q-axis voltage $V_{qe}$ is reduced which in turn reduces the resulting q-axis current $i_{qe}$.

Frequency reducing schemes work well at relatively high frequencies and poorly at low frequencies. This frequency based effectiveness difference is due to the fact that the commanded voltage splits between the resistive drop component $R_s i_{qe}$ and the reactive component $2\pi f_e \lambda_{rated}$ and the ratio of resistive to reactive drops is in great part based on frequency $f_e$. For example, at high frequencies (e.g., a name plate frequency) reactive drop component $2\pi f_e \lambda_{rated}$ may be ten or more times resistive drop component $R_s i_{qe}$ while at low frequencies the reactive drop may be one-fifth or less of the resistive drop. At high frequencies where the reactive drop is ten or more times the resistive drop, a reactive drop adjustment (e.g., $f_e$ adjustment) appreciably affects commanded voltage $V_{qe}$ while at a low frequency where the reactive drop may be a fraction of the resistive drop, a reactive drop adjustment may not be capable of avoiding a current trip. Other sources of error that can cause positive current feedback are also contemplated including imperfect switching characteristics that result in unexpected winding current levels, reflected waves caused by long power supply cables, etc.

Prior known solutions to the current tripping problem at low operating frequencies simply stepped the commanded voltage $V_{qe}$ to some level less than the voltage boost level $R_s i_{qe}$ and therefore resulted in sudden, unintended and undesirable changes in output torque to the load.

Thus, there is a need for an inexpensive method and/or apparatus that can smoothly control system current levels so as to avoid current trip conditions without causing undesirable torque pulsations at low operating frequencies.

BRIEF SUMMARY OF THE INVENTION

It has been recognized that the low frequency current tripping problem described above can be overcome by providing a voltage boost limiting mechanism that will hold the voltage boost level below a level that will cause a current limit condition. By implementing such a limiting scheme in conjunction with a frequency based current limiting scheme at higher frequencies, virtually all current tripping conditions, independent of frequency and independent of the source of excessive current, can be eliminated and overall smother system operation results.

To this end, the invention includes a method for use with an induction machine system including a controller and d and q-axis current feedback loops, the controller receiving a frequency command signal and generating d and q-axis voltage command signals, the method for limiting load current to a level below a limit current at low operating frequencies. The method comprises the steps of identifying an operating frequency, where the operating frequency is below a low threshold value: comparing a feedback current to the limit current and where the feedback current exceeds the limit current, reducing the q-axis voltage command value.

In one embodiment the step of comparing a feedback current includes comparing a q-axis feedback current to a maximum q-axis feedback current. In a more specific embodiment the method further includes the step of mathematically combining the limit current and a d-axis feedback current to identify the maximum q-axis feedback current. Here the step of mathematically combining may include taking the square root of the difference of the squares of the limit current and the d-axis current. Furthermore, the step of comparing a q-axis feedback current to a maximum q-axis feedback current may include subtracting the absolute value of the feedback current from the maximum q-axis feedback current to generate a difference value and the step of reducing includes reducing the q-axis voltage command value when the difference value is negative. Even more specifically, the controller may generate a nominal voltage boost value by multiplying a stator resistance value and the q-axis feedback current and the step of reducing may include multiplying the sign of the q-axis feedback current and the difference value to generate a signed difference value and mathematically combining the signed difference value and the nominal boost voltage to generate a limited boost voltage. Here the step of limiting further may include the step of mathematically combining the operating frequency and the limited boost value to generate the q-axis voltage command value. The threshold value may be less than one percent of a nameplate frequency for the induction machine.

In another embodiment the step of comparing a feedback current includes mathematically combining the d-axis and q-axis feedback currents to generate an instantaneous stator current and wherein the step of comparing includes comparing the instantaneous stator current to the limit current. Here, the step of mathematically combining may include taking the square root of the sum of the squares of the d-axis current and the q-axis current to generate the instantaneous stator current. Still more specifically, the step of comparing may include subtracting the instantaneous stator current from the current limit to generate a difference value and wherein the step of reducing includes reducing the q-axis voltage command value when the difference value is negative. Here a nominal voltage boost may be provided by a controller user and the step of reducing may include mathematically combining the difference value and the nominal boost voltage to generate a limited boost voltage. More specifically the step of limiting may further include the step of mathematically combining the operating frequency and the limited boost value to generate the q-axis voltage command value.

The invention also includes a method for use with an induction machine system including a controller and d and q-axis current feedback loops, the controller receiving a frequency command signal and generating d and q-axis voltage command signals, the method for limiting load current to a level below a limit current at low operating frequencies. Here the method comprises the steps of identifying an operating frequency, where the operating frequency is below a low threshold value: mathematically combining the d-axis feedback current and the limit current to generate a maximum q-axis feedback current; comparing the q-axis feedback current the maximum q-axis current and, where the q-axis feedback current exceeds the maximum q-axis current, reducing the q-axis voltage command value. In one aspect the step of mathematically combining includes taking the square root of the difference of the squares of the limit current and the d-axis current.

The invention also includes an apparatus for use with an induction machine system including a controller and d and q-axis current feedback loops, the controller receiving a frequency command signal and generating d and q-axis voltage command signals, the apparatus for limiting load current to a level below a limit current at low operating frequencies. The apparatus comprises a processor running a pulse sequencing program to perform the steps of: identifying an operating frequency, where the operating frequency is below a low threshold value, comparing a feedback current to the limit current and where the feedback current exceeds the limit current, reducing the q-axis voltage command value.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 2 is a schematic diagram illustrating the controller of FIG. 1 in greater detail;

FIG. 3 is a schematic diagram illustrating the d-axis voltage reference generator of FIG. 2 in greater detail;

DETAILED DESCRIPTION OF THE INVENTION

A. Hardware

Figure 1:
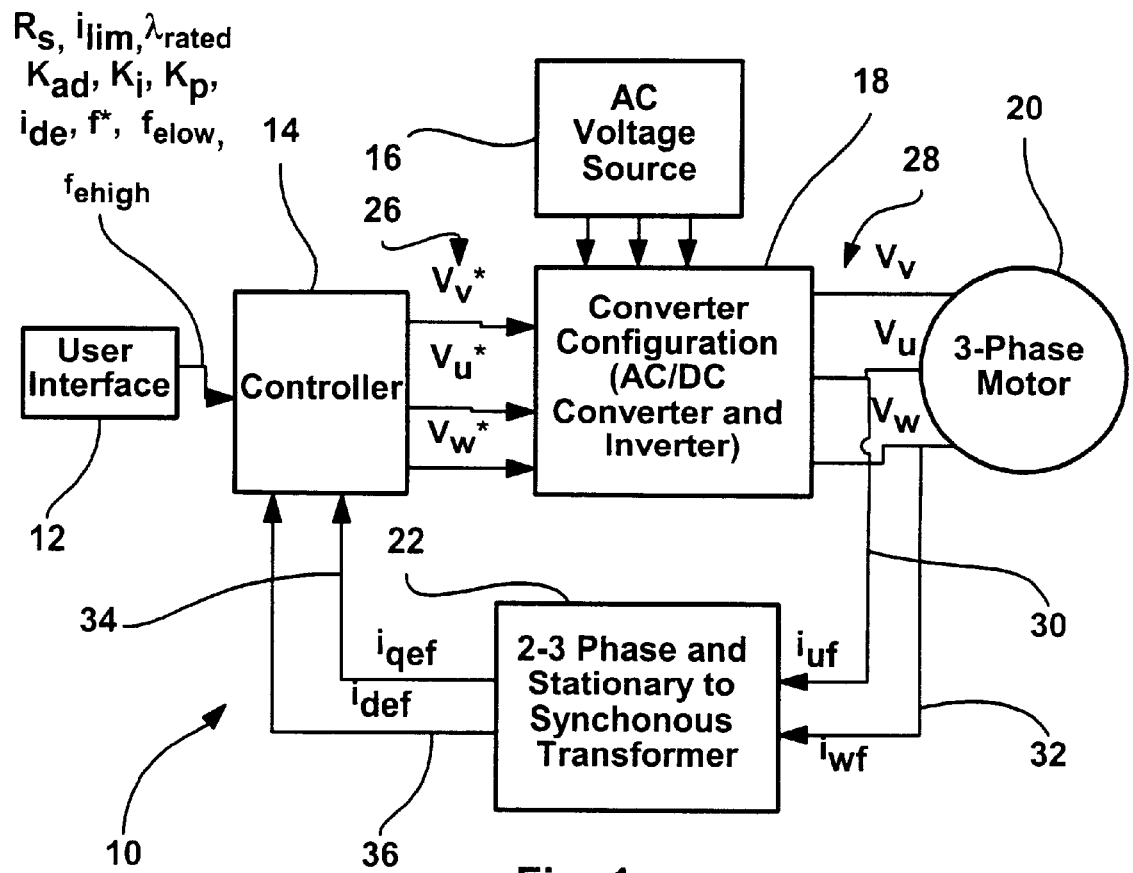
FIG. 1 is a schematic diagram of an exemplary motor control system according to the present invention.

In the description that follows, an "e" subscript is used to denote signals/values in a synchronous or rotating (as opposed to stationary) frame of reference, an "f" subscript denotes a feedback signal, a "q" subscript denotes a q-axis value, a "d" subscript denotes a d-axis value, "u", "v" and "w" subscripts denote signals corresponding to the three phases of the control system, an "*" superscript denotes a commanded value, a "lim" subscript denotes a limit value, "i" and "p" subscripts denote integral and proportional values, a "rated" subscript denotes a rated value, an "s" subscript denotes a stator related signal.

Referring now to the drawings wherein like reference numerals correspond to similar elements throughout the several views and, more specifically, referring to FIG. 1, the present invention will be described in the context of an exemplary motor control system 10 including a user interface 12, a controller 14, an AC voltage source 16, a converter configuration 18, a three-phase motor 20, a three-to-two phase and stationary to synchronous transformer 22 and various supply and control lines which will be described in more detail below. User interface 12 is used to provide various system operating characteristics including a stator resistance value $R_s$, a current limit value $i_{lim}$, a rated flux value $\lambda_{rated}$, a proportional gain factor $K_p$, an integral gain factor $K_i$, an acceleration/deceleration gain factor $K_{ad}$, a minimum electrical frequency $f_{elow}$ and a maximum electrical frequency $f_{ehigh}$, a d-axis current value $i_{dec}$ and a command frequency f*.

The acceleration/deceleration gain factor $K_{ad}$ is a value that is typically user selectable and will depend on the type of load being driven by the system 10—as its label implies, this rate simply indicates how quickly the load should be accelerated and decelerated. The minimum and maximum frequencies $f_{elow}$ and $f_{ehigh}$ are similarly user selectable and will typically be determined as a function of load characteristics (e.g., with certain loads the user will want to limit rotational frequencies to within a specific operating range). The current limit $i_{lim}$ is typically a rated or name plate current value which indicates an optimal maximum current corresponding to the converter configuration 18. The $K_p$ and $K_i$ values are simply scalars that are used to adjust how quickly the system 10 adjusts to reduce operating errors. The resistance $R_s$ is determined via a commissioning procedure, d-axis current value $i_{dec}$ is determined either via a commissioning procedure or via some suitable look-up table and the rated flux $\lambda_{rated}$ is determined by dividing a motor name plate voltage value by a nameplate frequency (in Hz). The command frequency f* indicates a desired rotor speed.

Controller 14 use the received signals from interface 12 along with various feedback signals to generate three-phase voltage command signals $V_v^*$, $V_u^*$ and $V_w^*$ on trigger lines 26. The trigger lines 26 are linked to converter configuration 18 which, as well known in the art, includes both an AC/DC converter and an inverter. AC voltage source 16 provides three-phase AC voltage to the converter configuration 18 which converts that AC voltage to a DC voltage and then converts the DC voltage to three-phase AC voltage on three motor supply lines 28.

Supply lines 28 are each separately linked to one of the three phases of motor 20 to provide voltages $V_v$, $V_u$ and $V_w$ thereto, respectively. The phase voltages cause currents within the stator windings of motor 20 that, together, generate a rotating stator flux field within a stator cavity (not illustrated). A motor rotor is mounted within the stator cavity for rotation about a rotation axis. The rotating stator flux field induces currents in the motor rotor bars which in turn generate a rotor flux field that interacts with the stator flux field to cause the rotor to rotate within the stator cavity.

Referring still to FIG. 1, two separate currents sensors (not illustrated) are linked to the supply lines corresponding to the u and w motor phases to provide two-phase current feedback signals $i_{uf}$ and $i_{wf}$ in the stationary frame of reference to transformer 22 via lines 30 and 32. As well known in the controls art, transformer 22 converts the stationary two-phase currents $i_{uf}$ and $i_{wf}$ to two-phase synchronous feedback currents $i_{qef}$ and $i_{def}$ on lines 34 and 36, respectively. Feedback currents $i_{qef}$ and $i_{def}$ are provided to controller 14.

Referring now to FIG. 2, controller 14 is illustrated in greater detail and includes a d-axis voltage reference generator 40, a q-axis voltage reference generator 42, a frequency based current limiter 48 and a synchronous to stationary and two-to-three phase transformer 50. Q-axis voltage reference generator 42 includes both a nominal torque boost 44 and a torque boost limiter 46. The synchronous to stationary and two-to-three phase transformer 50 is well known in the art and therefore will not be explained here in detail. It should suffice to say that transformer 50 receives synchronous d and q-axis voltage command signals $V_{de}$ and $V_{qe}$, respectively, and transforms those two synchronous voltages to two-phase stationary voltages and then transforms the two-phase stationary voltages into three-phase stationary command voltages $V_v^*$, $V_u^*$, and $V_w^*$ on trigger lines 26 which are linked to the converter configuration switches (e.g., converter 18 as illustrated in FIG. 1). The d-axis voltage reference generator 40, nominal torque boost 44, frequency based current limiter 48 and torque boost limiter 46 are illustrated in greater detail in FIGS. 3, 4, 5 and 6, respectively.

Referring now to FIG. 3, d-axis voltage reference generator 40 includes a single multiplier 52 and, consistent with Equation 2 above, multiplies the stator resistance value $R_s$ and the d-axis synchronous current value $i_{dec}$ to generate the synchronous d-axis voltage value $V_{de}$ which is provided to transformer 50 (see again FIG. 2).

Figure 4:
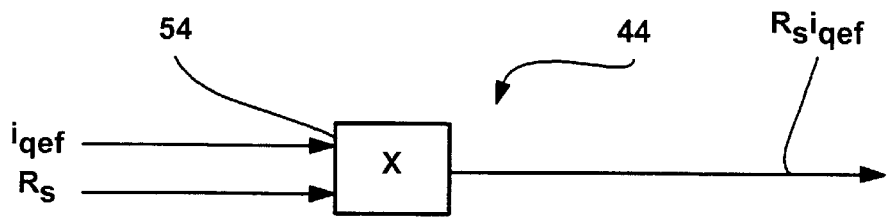
FIG. 4 is a schematic diagram illustrating the nominal torque boost of FIG. 2 in greater detail.

Referring to FIG. 4, the nominal torque boost 44 includes a single multiplier 54 that multiplies the stator resistance $R_s$ and the synchronous q-axis feedback current $i_{qef}$ to generate the nominal voltage boost or resistive voltage drop value $R_s i_{qef}$ that comprises the first term on the right-hand side of Equation 1 above. This nominal value $R_s i_{qef}$ is provided to the torque boost limiter 46 as illustrated in FIG. 2.

Figure 5:
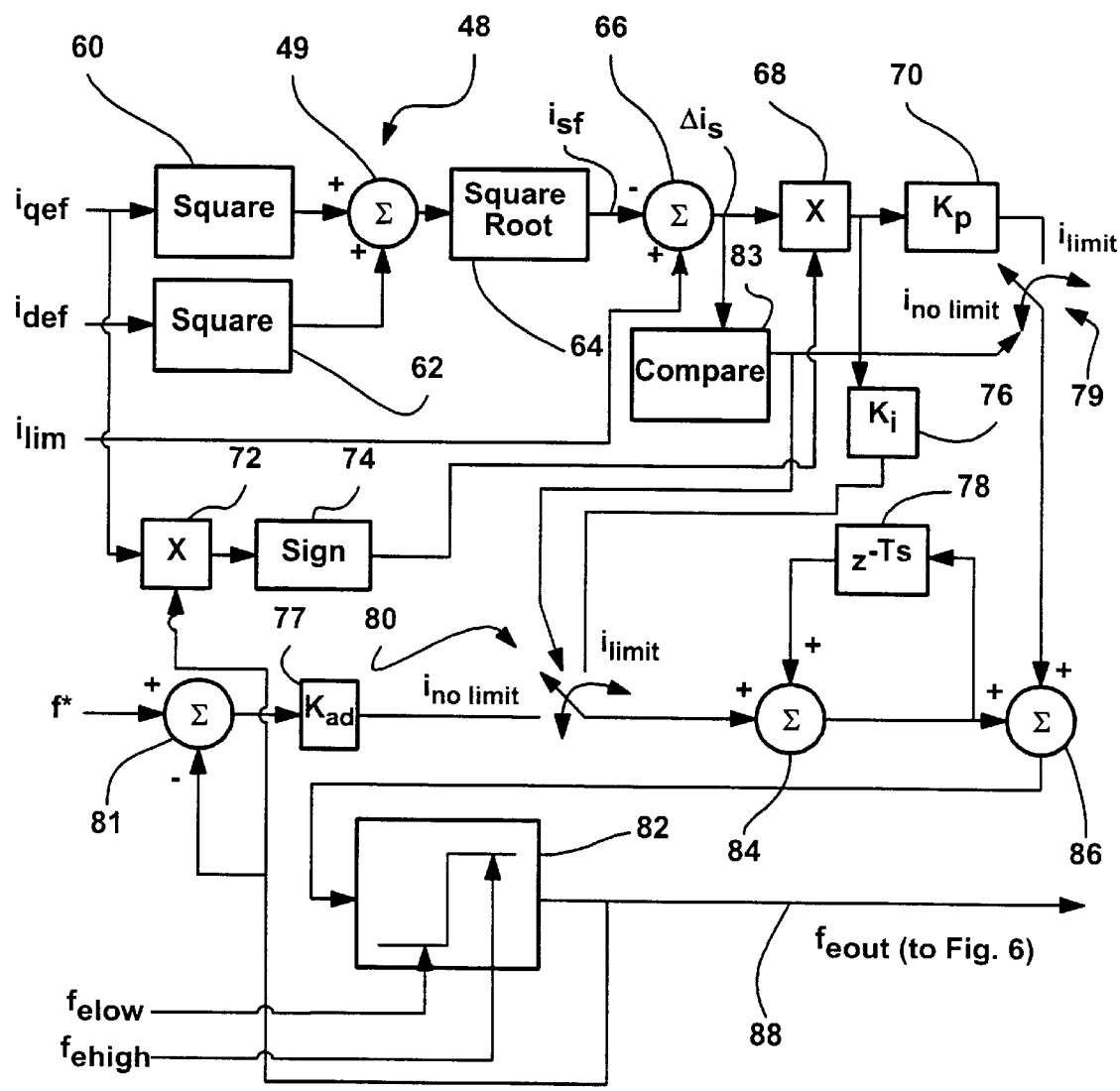
FIG. 5 is a schematic diagram illustrating the frequency based current limiter of FIG. 2 in greater detail.

Referring now to FIG. 5, the frequency based current limiter 48 receives the q and d-axis feedback currents $i_{qef}$ and $i_{def}$, respectively, the current limit value $i_{lim}$, the frequency command $f_e$ and the high and low frequency limit values $f_{ehigh}$ and $f_{elow}$, respectively, and generates an output frequency value $f_{eout}$ that is provided to torque boost limiter 46. Current limiter 48 includes, in at least one embodiment, first and second square modules 60 and 62, respectively, five summers including a first summer 49, a second summer 66, a third summer 84, a fourth summer 86 and a fifth summer 81, a single square root module 64, two multipliers including a first multiplier 68 and a second multiplier 72, three scalar modules including a proportional scalar module 70, an integral scalar module 76 and an acceleration/deceleration scalar module 77, a single sign module 74, a digital integrator module 78, a single pole switch 79, a double pole switch 80, a frequency range limiter 82 and a comparator 83. First square module 60 receives the synchronous q-axis feedback current $i_{qef}$ and, as its label implies, provides the square of the feedback current $i_{qef}$. Similarly, second square module 62 received the synchronous d-axis feedback current $i_{def}$ and squares that received value. The outputs of square modules 60 and 62 are added together by first summer 49 and the square root module 64 provided the square root of that sum as an output to second summer 66. The output of square root module 64 is a stator current feedback value $i_{sf}$ corresponding to the instantaneous stator current magnitude.

Referring still to FIG. 5, the stator feedback current $i_{sf}$ is subtracted from the stator current limit value $i_{lim}$ via second summer 66 and the difference between the two values $\Delta i_s$ is provided to first multiplier 68. Difference value $\Delta i_s$ indicates whether or not the instantaneous motor current exceeds the limit value $i_{lim}$. Here, where the difference value $\Delta i_s$ is positive, the instantaneous current is less than the limit current $i_{lim}$ and the current limiting scheme is not activated. Where the difference value $\Delta i_s$ is negative, however, the instantaneous current exceeds the limit current $i_{lim}$ and a frequency reducing scheme is activated to reduce system current.

Difference value $\Delta i_s$ is provided to comparator 83 which compares difference value $\Delta i_s$ to zero and controls switches 79 and 80 as a function of the comparison. When value $\Delta i_s$ is positive (i.e., the current limit has not been exceeded) comparator 83 opens switch 79 and links switch 80 to a "no limit" input pole to cause normal system operation. When value $\Delta i_s$ is negative (i.e., the current limit $i_{lim}$ has been exceeded), comparator 83 closes switch 79 and links switch 80 to a second input pole to reduce the output frequency $f_{eout}$ of module 48.

Referring still to FIG. 5, second multiplier 72 receives the q-axis feedback signal $i_{qef}$ along with an electrical frequency output signal $f_{eout}$ generated by module 48 and multiplies those two signals to generate a signal having a sign that indicates whether or not the load is in a motoring state or a regenerating state and the direction of the load. Here, the output of multiplier 72 is provided to sign module 74 to identify the sign (i.e., + or −) of the received signal. The sign is provided to multiplier 68 which multiplies the sign by difference value $\Delta i_s$. The output of first multiplier 68 is provided to each of the first and second scalar modules 70 and 76, respectively.

Referring still to FIG. 5, scalar modules 70 and 76 multiply the signed difference value $\Delta i_s$ by scalar gains $K_p$ and $K_i$, respectively, and provide the stepped up values as current limit values to the current limit inputs of switches 79 and 80, respectively. As indicated above, the $K_i$ and $K_p$ values determine how quickly the system forces system frequency lower when an excessive current condition occurs and are, at least in some embodiments, user selectable.

Output frequency $f_{eout}$ is provided to summer 81 which subtracts output frequency $f_{eout}$ from command frequency $f^*$ to generate a frequency error value $\Delta f$. Error value $\Delta f$ is stepped up by the acceleration/deceleration gain $K_{ad}$ at block 77 and the stepped up error value $K_{ad}\Delta f$ is provided as the "no current limit" input to the no current limit pole of switch 80.

As taught above, when the instantaneous load current is less than the limit current $i_{lim}$, comparator 83 opens switch 79 and links the output of module 77 to summer 84 thereby affecting normal controller operation where the system drives the system output frequency $f_{eout}$ toward the commanded frequency $f^*$. Here, summer 84 and integrator module 78 operate to expedite the frequency following process and the output of summer 84 is passed on to limiter 82. Limiter 82 maintains the output frequency $f_{eout}$ within an acceptable range (i.e., between $f_{elow}$ and $f_{ehigh}$).

Referring yet again to FIG. 5, when the instantaneous load current (i.e., $i_{sf}$) is greater than limit current $i_{lim}$, comparator 83 closes switch 79 to link the output of proportional scalar module 70 to one input of summer 86 and switches the output of scalar module 76 to the input of summer 84. The output of summer 84 is provided as a second input to summer 86. The output of summer 86 is provided to limiter 82 and the output of limiter 82 is provided to boost limiter 46 (see again FIG. 2). Thus, it should be appreciated that the frequency based current limiter, as its name implies, adjusts the output frequency as a function of the difference between a feedback stator current $i_{sf}$ and the limit current $i_{lim}$ in an attempt to maintain the stator current below the limit value $i_{lim}$.

Figure 6:
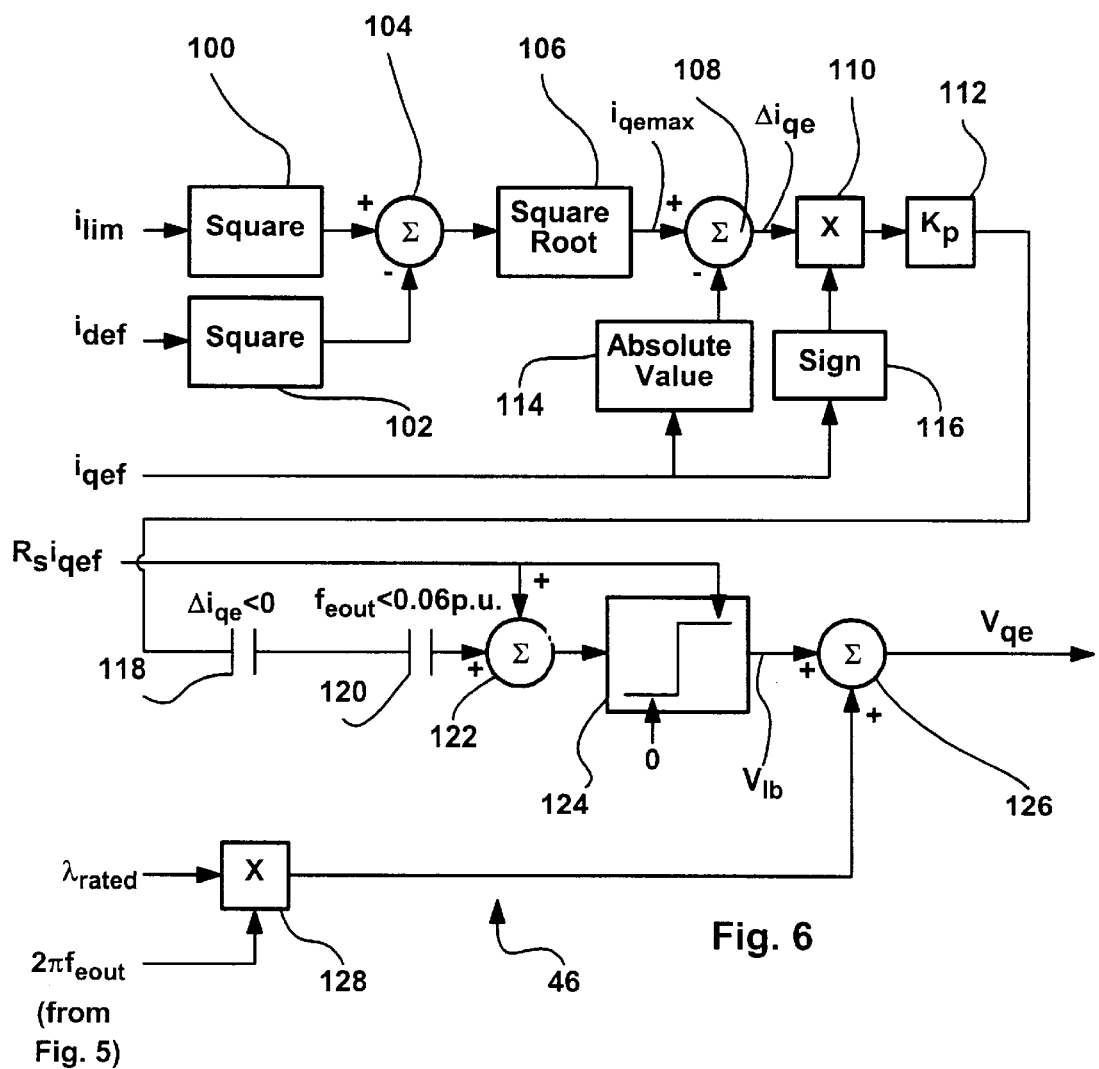
FIG. 6 is a schematic diagram illustrating the torque boos limiter of FIG. 2 in greater detail.

Referring now to FIG. 6, one exemplary embodiment of the torque boost limiter 46 includes first and second square modules 100 and 102, first through fourth summers 104, 108, 122 and 126, one square root module 106, first and second multiplier 110 and 128, respectively, a proportional gain module 112, an absolute value module 114, a sign module 116, first and second normally open (NO) contacts 118 and 120 and a limiter module 124. The current limit value $i_{lim}$ is squared by module 100 and its output is provided to summer 104. Similarly, the synchronous d-axis feedback signal $i_{def}$ is squared by module 102 and its output is provided to summer 104. Summer 104 subtracts the output of module 102 from the output of module 100 and provides the different to square module 106 which, as its label implies, provides the square root of the received value as an output $i_{qemax}$. Thus, the output of module 106 corresponds to a maximum synchronous q-axis current value $i_{qemax}$ given the current limit value $i_{lim}$ and the synchronous d-axis feedback signal $i_{def}$ fed to modules 100 and 102. If maximum value $i_{qemax}$ is exceeded an excess current condition will likely occur.

Absolute value module 114 receives the synchronous q-axis feedback current $i_{qef}$ and provides the absolute value thereof to summer 108. Summer 108 subtracts the absolute value of feedback current $i_{qef}$ 114 from the maximum synchronous q-axis current $i_{qemax}$ and provides a q-axis difference value $\Delta i_{qe}$ as an output to multiplier 110. Q-axis difference value $\Delta i_{qe}$, like difference value $\Delta i_s$ in FIG. 5, indicates an excessive current condition. To this end, where q-axis difference value $\Delta i_{qe}$ is positive, the instantaneous q-axis feedback current is less than maximum value $i_{qemax}$ and no limit condition exists (i.e., a current tripping condition does not exist). However, where q-axis difference value $\Delta i_{qe}$ is negative, the instantaneous q-axis feedback current $i_{qef}$ is greater than maximum value $i_{qemax}$ and an excessive q-axis current condition exists.

Sign module 116, as its label implies, determine the sign of q-axis feedback current $i_{qef}$ and provides that sign as an input to multiplier 110. Multiplier 110 multiplies difference value $\Delta i_{qe}$ and the sign of the q-axis feedback current $i_{qef}$ and provides the result as an input to proportional scalar module 112. Module 112 multiplies its input by proportional gain factor $K_p$ and provides its output to first contact 118. Upon examination of the calculations performed by the upper portion of limiter 46 as illustrated in FIG. 6, it should be appreciated that the input to contact 118 will always be a value that tends to drive the q-axis current $i_{qe}$ toward the maximum q-axis value $i_{qemax}$. For instance, in the case of positive rotation motoring where q-axis current $i_{qef}$ exceeds maximum value $i_{qemax}$, the value provided to contact 118 will be negative. Similarly, during positive motoring where q-axis current $i_{qef}$ is less than maximum value $i_{qemax}$, the value provided to contact 118 will be positive. Other scenarios with negative motoring, positive generation and negative generation are contemplated.

Contact 118 is controlled by the sign of difference value $\Delta i_{qe}$. Where the sign of value $\Delta i_{qe}$ is positive (i.e., $i_{qef}$ is less than $i_{qemax}$), contact 118 remains open and the nominal torque boost value determined by module 44 is not altered. However, where q-axis difference value $\Delta i_{qe}$ is negative (i.e., $i_{qef}$ is greater than $i_{qemax}$), contact 118 is closed to facilitate reduction of boost value $R_s i_{qef}$ as described below.

The output of contact 118 is provided to contact 120. Contact 120 is controlled as a function of the output frequency $f_{eout}$ such that the torque boost limiter is only activated when the output frequency $f_{eout}$ is at a relatively small fraction of a motor nameplate frequency (e.g., 0.06 p.u.). Thus, in the present example, where output frequency $f_{eout}$ is greater than 0.06 p.u. the nameplate frequency contact 120 remains open and where $f_{eout}$ is less than 0.06 p.u. of the nameplate frequency contact 120 is closed.

Referring still to FIG. 6, summer 122 receives the nominal torque boost $R_s i_{qef}$ from the nominal torque boost module (see FIG. 4) and adds the nominal torque boost $R_s i_{qef}$ to the output of contact 120 (i.e., either a zero value if either of contacts 118 or 120 or both contacts 118 and 120 are open or the stepped up signed value $K_p \Delta i_{qe}$) and provides its output to limiter module 124. Limiter module. 124 limits the voltage boost term to between zero and the nominal torque boost value $R_s i_{qef}$ and provides a limited voltage boost value $V_{lb}$ as an input to summer 126.

Referring yet again to FIG. 6, multiplier 128 multiplies the rated flux current $\lambda_{rated}$ and $2\pi$ times the electrical output frequency $f_{eout}$ thereby generating the reactive voltage drop value $2\pi f_e \lambda_{rated}$. The reactive value is provided as a second input to summer 126. Summer 126 adds the limited voltage boost value $V_{lb}$ and the reactive voltage drop thereby generating the synchronous q-axis voltage value $V_{qe}$ which is provided to transformer 50 as illustrated in FIG. 2.

B. Experimental Results

Figure 7:
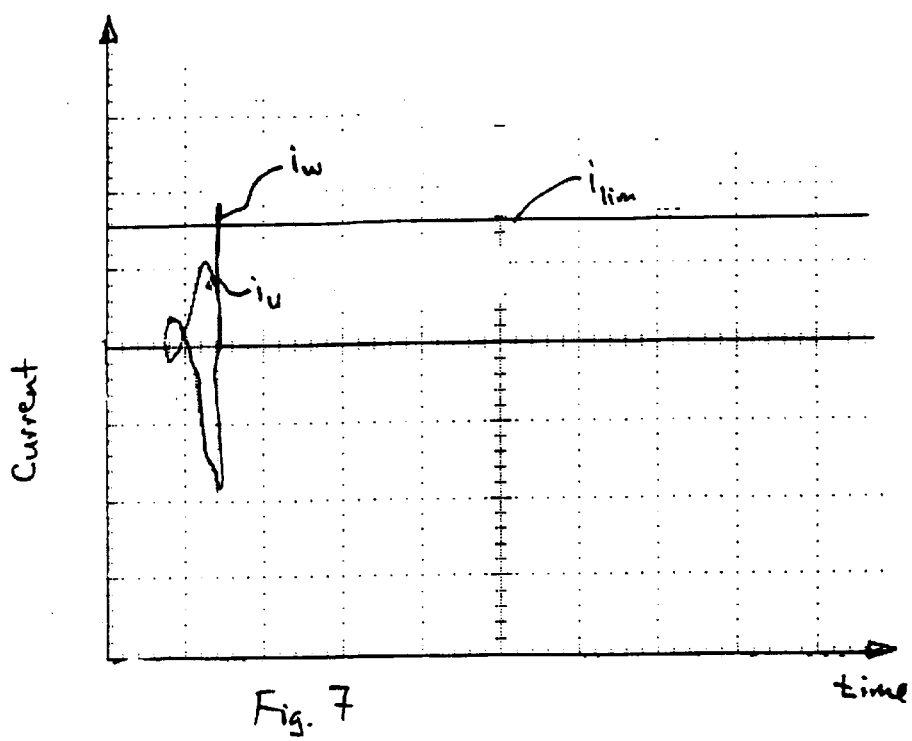
FIG. 7 is a graph illustrating two motor currents generated without the low frequency current limiting method of the present invention.

Referring now to FIG. 7, waveforms corresponding to measured current data for two of three motor phases generated without the inventive system are illustrated. It can be seen that, relatively quickly, under the circumstances tested, the w-phase motor current value exceeded a current limit reference value $i_{lim}$ and the current tripping mechanism of the motor control system is activated thereby cutting off current to the motor.

Figure 8:
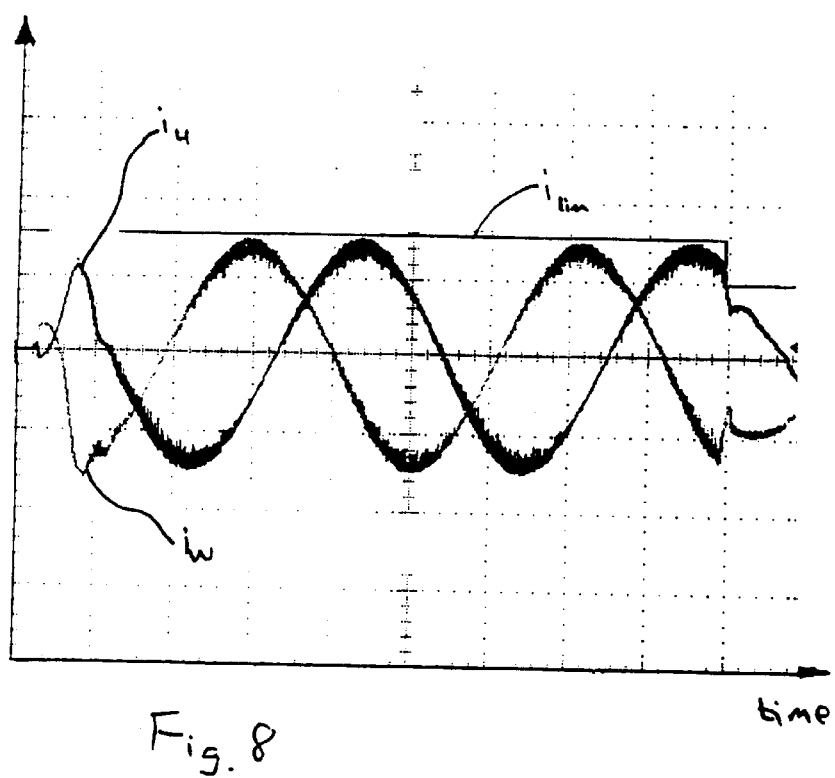
FIG. 8 is similar to FIG. 7 albeit illustrating two currents where the inventive method has been adopted.
Figure 10:
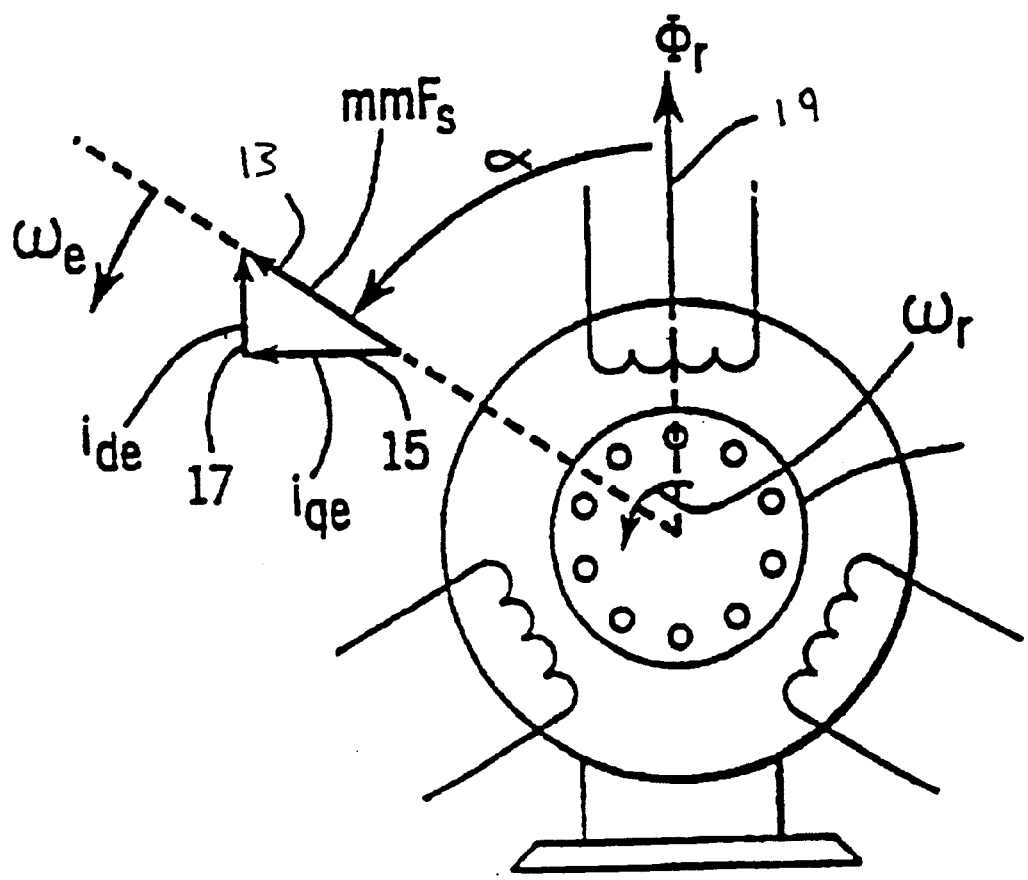
FIG. 10 is a schematic diagram illustrating various motor operating parameters.

Referring to FIG. 8, waveforms corresponding to two-phase currents that are similar to the waveforms of FIG. 7 are illustrated, albeit generated using a controller employing the inventive torque/voltage boost limiting method. To this end, comparing FIGS. 7 and 8, it can be seen that the current trip in FIG. 7 is avoided and instead, the inventive system used to generate the waveform of FIG. 8 simply and smoothly adjusts both system frequency $f_e$ and the commanded system current to avoid a trip condition.

C. Other Embodiments

A method similar to that described above can be applied in the case of a simple V/f controller where a system operator or user sets a low speed voltage boost directly via an adjustable user parameter (e.g., via a user interface—see again FIG. 1). Here, when the voltage boost parameter is set too high, a current trip condition can occur.

Figure 9:
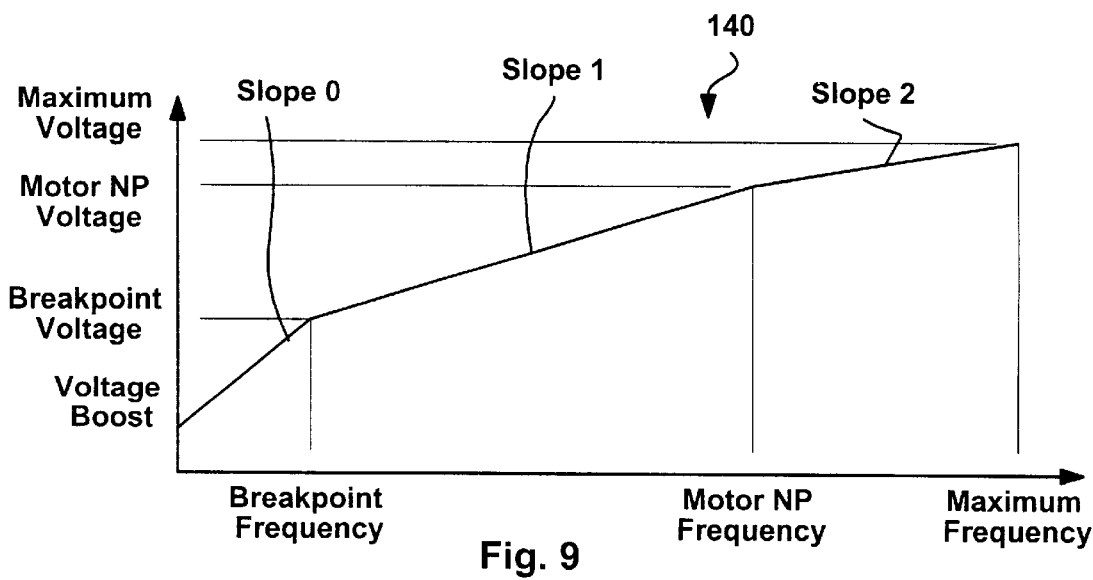
FIG. 9 is a simple voltage/frequency voltage reference generation curve.

Referring to FIG. 9, a voltage-frequency curve is illustrated that shows operation of a typical simple V/f drive. Here, it can be seen that there are generally three separate zones of operation corresponding to three differently sloped sections of characteristic curve. The three zones include a first zone between zero frequency and a break point frequency (e.g., 0.06 p.u. the nameplate frequency), a second zone between the breakpoint frequency and the nameplate frequency and a third zone above the nameplate frequency.

As in the case above, in the present case, the invention is provided to kick in at low operating frequencies and hence is only concerned with system operation between zero and the breakpoint frequency. Again, at higher operating frequencies it is assumed that the frequency limiting scheme described above (see again FIG. 5) will limit current and avoid current tripping conditions.

In this simplified system type, the voltage reference equations can be expressed as:

$$V_{qe} = V_{\text{boost}} + \left(\frac{V_{BP} - V_{\text{boost}}}{f_{BP}}\right) f_{eout} \qquad \text{Eq. 3}$$

$$V_{de} = 0 \qquad \text{Eq. 4}$$

where $V_{boost}$ is the user set boost voltage value, $V_{BP}$ is the breakpoint voltage (see again FIG. 9) and $f_{BP}$ is the breakpoint frequency.

Figure 11:
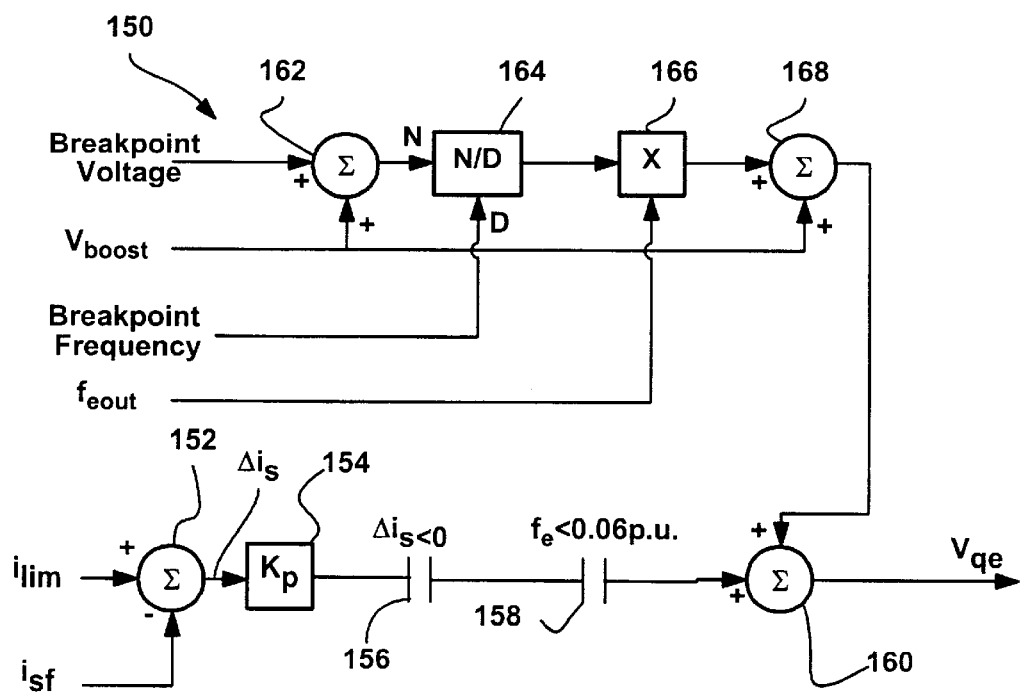
FIG. 11 is a schematic diagram illustrating a second embodiment of the q-axis voltage reference generator of FIG. 2.

Referring now to FIG. 11, a second simplified q-axis voltage reference generator 150 is illustrated. In FIG. 11, the generator includes four summers 162, 168, 152 and 160, one divider 164, one multiplier 166, one scalar module 154 and two contacts 156 and 158. Here a user supplies each of the breakpoint voltage and frequency values as well as a desired voltage boost value $V_{boost}$ and the current limit value $i_{lim}$. In addition, the output frequency $f_{eout}$ is obtained from limiter 82 in FIG. 5 and a feedback current $i_{sf}$ can be obtained from the output of square root module 64 in FIG. 5.

Summer 162 adds the breakpoint voltage $V_{BP}$ and boost voltage value $V_{boost}$ and provides the sum to divider module 164. Divider module 164 divides the sum from summer 162 by the breakpoint frequency $f_{BP}$. Multiplier 166 multiplies the output of divider 164 by output frequency $f_{eout}$ to provide the reactive second term in Equation 3 above. Next, summer 168 adds the voltage boost value $V_{boost}$ to the output of multiplier 166 thereby completing Equation 3 and generating an un-limited q-axis voltage value $V_{qe}$.

Referring still to FIG. 11, summer 152 subtracts the feedback current $i_{sf}$ from the current limit value $i_{lim}$ to generate a difference value $\Delta i_s$ which is stepped up by module 154 and is provided to contact 156. Contact 156 is similar to contact 118 in FIG. 6 except that contact closure is conditioned upon stator current difference value $\Delta i_s$ instead of q-axis current difference value $\Delta i_{qe}$. Thus, contact 156 closes when value $\Delta i_s$ is negative and remains open when stator current difference value $\Delta i_s$ is positive. Contact 158 operates in a fashion that is identical to contact 120 in FIG. 6.

Summer 160 adds the output of summer 168 and contact 158. The value of the signal from contact 158 is always negative or zero and therefore summer 160 either leaves the $V_{qe}$ value unchanged or reduces the value at low frequencies $f_{eout}$ and when the limit current $i_{lim}$ is exceeded.

Although not illustrated in FIG. 11, it is contemplated that the frequency based current limiter of FIG. 5 or some configuration similar thereto would operate along with the FIG. 11 configuration. In addition, at frequencies below the breakpoint frequency, the d-axis voltage reference $V_{de}$ provided to transformer 50 in FIG. 2 is set to zero.

Figure 12:
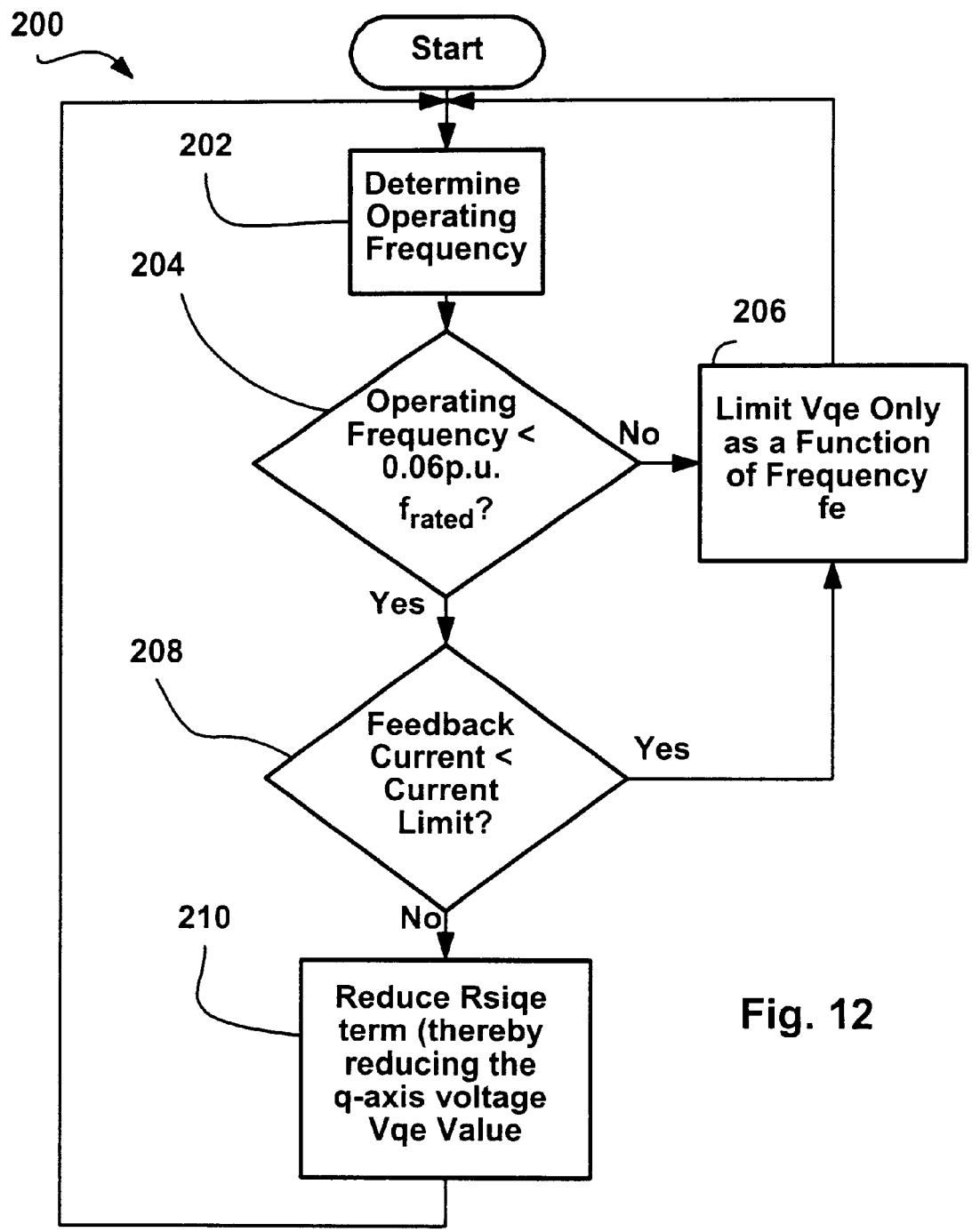
FIG. 12 is a flow chart illustrating an inventive method performed by the controller of FIG. 1.

A general method 200 according to the present invention is illustrated in FIG. 12. In FIG. 12, beginning at block 202, the controller 14 (i.e., a processor within controller 14 running a pulse sequencing program) determines the system operating frequency $f_e$. At block 204, if the operating frequency is greater than a threshold value (e.g., 0.06 p.u. the rated or nameplate frequency $f_{rated}$), control passes to block 206 where the controller 14 operates to limit the q-axis voltage by simply adjusting frequency $f_e$ when necessary. Where $f_e$ is less than the threshold value control passes to block 108 where controller 14 determines if the feedback current (e.g., $i_{qef}$ or $i_{sf}$) is less than the corresponding current limit (e.g., $i_{lim}$ in the case of $i_{sf}$ and $i_{qemax}$ in the case of $i_{qef}$). Where the feedback current is less than the limit current control passes to block 206 and $V_{qe}$ is limited by controlling frequency $f_e$. However, at block 208, where the feedback current exceeds the limit or maximum current, control passes to block 210 where controller 14 reduces boost value $R_s i_{qe}$ to maintain the system current below a trip condition.

While the invention as described above in the context of an exemplary method and apparatus, it should be appreciated by those skilled in the art that the present invention contemplates other embodiments and therefore should not be limited by the description above and instead, the claims that follow hereafter should be referred to determine the scope of the invention. For example, while the invention is described as one wherein either a q-axis current feedback or a stator feedback current is used to determine when the voltage boost value should be altered, it should be appreciated that current derivatives such as a filtered current feedback signal may be employed instead of a pure q-axis or stator feedback current value. Other modifications to the embodiment above are contemplated.

To apprise the public of the scope of this invention, the following claims are made.

What is claimed is:

1. A method for use with an induction machine system including a controller and d and q-axis current feedback loops, the controller receiving a frequency command signal and generating d and q-axis voltage command signals, the method for limiting load current to a level below a limit current at low operating frequencies, the method comprising the steps of:
    identifying a system operating frequency;
    where the operating frequency is below a low threshold value:
       comparing a feedback current to the limit current; and
       where the feedback current exceeds the limit current, reducing the q-axis voltage command value.

2. The method of claim 1 wherein the step of comparing a feedback current includes comparing a q-axis feedback current to a maximum q-axis feedback current.

3. The method of claim 2 further including the step of mathematically combining the limit current and a d-axis feedback current to identify the maximum q-axis feedback current.

4. The method of claim 3 wherein the step of mathematically combining includes taking the square root of the difference of the squares of the limit current and the d-axis current.

5. The method of claim 4 wherein the step of comparing a q-axis feedback current to a maximum q-axis feedback current includes subtracting the absolute value of the feedback current from the maximum q-axis feedback current to generate a difference value and the step of reducing includes reducing the q-axis voltage command value when the difference value is negative.

6. The method of claim 5 wherein the controller generates a nominal voltage boost value by multiplying a stator resistance value and the q-axis feedback current and wherein the step of reducing includes multiplying the sign of the q-axis feedback current and the difference value to generate a signed difference value and mathematically combining the signed difference value and the nominal boost voltage to generate a limited boost voltage.

7. The method of claim 6 wherein the step of limiting further includes the step of mathematically combining the operating frequency and the limited boost value to generate the q-axis voltage command value.

8. The method of claim 1 wherein the threshold value is less than one percent of a nameplate frequency for the induction machine.

9. The method of claim 1 wherein the step of comparing a feedback current includes mathematically combining the d-axis and q-axis feedback currents to generate an instantaneous stator current and wherein the step of comparing includes comparing the instantaneous stator current to the limit current.

10. The method of claim 9 wherein the step of mathematically combining includes taking the square root of the sum of the squares of the d-axis current and the q-axis current to generate the instantaneous stator current.

11. The method of claim 10 wherein the step of comparing includes subtracting the instantaneous stator current from the current limit to generate a difference value and wherein the step of reducing includes reducing the q-axis voltage command value when the difference value is negative.

12. The method of claim 11 wherein a nominal voltage boost is provided by a controller user and the step of reducing includes mathematically combining the difference value and the nominal boost voltage to generate a limited boost voltage.

13. The method of claim 11 wherein the step of limiting further includes the step of mathematically combining the operating frequency and the limited boost value to generate the q-axis voltage command value.

14. A method for use with an induction machine system including a controller and d and q-axis current feedback loops, the controller receiving a frequency command signal and generating d and q-axis voltage command signals, the method for limiting load current to a level below a limit current at low operating frequencies, the method comprising the steps of:
    identifying a system operating frequency;
    where the operating frequency is below a low threshold value:
       mathematically combining the d-axis feedback current and the limit current to generate a maximum q-axis feedback current;
       comparing the q-axis feedback current the maximum q-axis current; and
       where the q-axis feedback current exceeds the maximum q-axis current, reducing the q-axis voltage command value.

15. The method of claim 14 wherein the step of mathematically combining includes taking the square root of the difference of the squares of the limit current and the d-axis current.

16. An apparatus for use with an induction machine system including a controller and d and q-axis current feedback loops, the controller receiving a frequency command signal and generating d and q-axis voltage command signals, the apparatus for limiting load current to a level below a limit current at low operating frequencies, the apparatus comprising:
    a processor running a pulse sequencing program to perform the steps of:
       identifying a system operating frequency;
       where the operating frequency is below a low threshold value:

comparing a feedback current to the limit current; and where the feedback current exceeds the limit current, reducing the q-axis voltage command value.

17. The apparatus of claim 16 wherein the processor runs the pulse sequencing program to mathematically combine the limit current and a d-axis feedback current to identify the maximum q-axis feedback current and to perform the step of comparing a feedback current by comparing a q-axis feedback current to a maximum q-axis feedback current.

18. The apparatus of claim 17 wherein the processor performs the step of mathematically combining by taking the square root of the difference of the squares of the limit current and the d-axis current.

19. The apparatus of claim 18 wherein the processor performs the step of comparing a q-axis feedback current to a maximum q-axis feedback current by subtracting the absolute value of the feedback current from the maximum q-axis feedback current to generate a difference value and performs the step of reducing by reducing the q-axis voltage command value when the difference value is negative.

20. The apparatus of claim 19 wherein the controller generates a nominal voltage boost value by multiplying a stator resistance value and the q-axis feedback current and wherein the processor performs the step of reducing by multiplying the sign of the q-axis feedback current and the difference value to generate a signed difference value and mathematically combining the signed difference value and the nominal boost voltage to generate a limited boost voltage.

* * * * *